(12) United States Patent
Lee (10) Patent No.: US 7,337,359 B2
(45) Date of Patent: Feb. 26, 2008

(54) SYSTEM AND METHOD FOR RECOVERING A DEVICE STATE

(75) Inventor: Sam Jung-Won Lee, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 522 days.

(21) Appl. No.: 10/878,750

(22) Filed: Jun. 28, 2004

(65) Prior Publication Data

US 2005/0289382 A1    Dec. 29, 2005

(51) Int. Cl.
*G06F 11/00*    (2006.01)
(52) U.S. Cl. ......................................................... 714/19
(58) Field of Classification Search .................. 714/19, 714/2
See application file for complete search history.

(56) References Cited

U.S. PATENT DOCUMENTS

| | | | |
|---|---|---|---|
| 6,588,011 B1* | 7/2003 | Giammaria | 717/174 |
| 6,591,376 B1* | 7/2003 | VanRooven et al. | 714/36 |
| 6,948,166 B2* | 9/2005 | Barfield et al. | 717/174 |
| 2002/0092010 A1* | 7/2002 | Fiske | 717/168 |
| 2005/0138468 A1* | 6/2005 | Asare et al. | 714/13 |

OTHER PUBLICATIONS

"WhatChanged? for Windows" (Dec. 12, 2002) Prism Microsystems, Inc. Retrieved from Internet Archive Jan. 29, 2007 <http://web.archive.org/web/20021218041403/http://www.whatchanged.com/whatchanged/doc/wcbro3.PDF>.*
"Sprite Software—Products—Pocket Backup" (Feb. 1, 2003) Sprite Software, Inc. Retreived from Internet Archive Jan. 24, 2007 <http://web.archive.org/web/20030201163409/www.spritesoftware.com/pocket_backup.html>.*
Bott, Ed and Person, Ron. "Special Edition Using Windows 95 with Internet Explorer 4.0." Indianapolis: Que, 1998, ch. 9.*

\* cited by examiner

*Primary Examiner*—Scott Baderman
*Assistant Examiner*—Kevin D Scarbery (57) ABSTRACT

In one embodiment, a system and a method for recovering a device state related to detecting the installation of an application on a computing device, identifying information that pertains to the application, and storing the identified information in nonvolatile memory of the computing device so that the information can be recovered if a reset process is performed.

25 Claims, 6 Drawing Sheets

SYSTEM AND METHOD FOR RECOVERING A DEVICE STATE

BACKGROUND

Certain computing devices permit the user to perform a "factory" reset in which current data and settings of the device are erased and the device is restored to its original state when it reached the user (i.e., the factory default state). Such a feature can be useful in cases in which a user has made various changes to the device configuration and wishes to undo those changes, for instance, if the user no longer desires a new configuration he or she implemented and/or the device does not operate well under its current configuration.

When a factory reset is performed, the operating system registry may be deleted and rebuilt anew to restore its original state. Although such deletion and rebuilding is not per se undesirable, it can create problems in cases in which the user has installed applications on the device that did not form part of the initial device state. Specifically, even though the factory reset may not delete the applications that the user has installed, the reset may delete all registry entries associated with those applications, thereby orphaning those applications such that they are not recognized by the operating system and are not accessible to the user. In such a case, the user must reinstall the applications if he or she wishes to use them on the computing device.

SUMMARY OF THE DISCLOSURE

In one embodiment, a system and a method for recovering a device state relate to detecting installation of an application on a computing device, identifying information that pertains to the application, and storing the identified information in nonvolatile memory of the computing device so that the information can be recovered if a reset process is performed.

BRIEF DESCRIPTION OF THE DRAWINGS

The disclosed system and method can be better understood with reference to the following drawings. The components in the drawings are not necessarily to scale.

DETAILED DESCRIPTION

Disclosed are a systems and methods for restoring a device state. More particularly, disclosed are systems and methods for restoring a state of a computing device on which user applications have been installed after an initial boot process. With the disclosed systems and methods, backup copies of certain files that pertain to the installed applications can be stored in nonvolatile memory separate from the operating system registry. Due to the storage of that information, the computing device can be restored to a state in which the installed applications are both recognized by the operating system and are accessible to the user. By way of example, the information includes registry files that reference the applications and identify their respective configurations and link files that define selectable links (e.g., on the desktop and/or in the start menu) to the applications.

Figure 1:
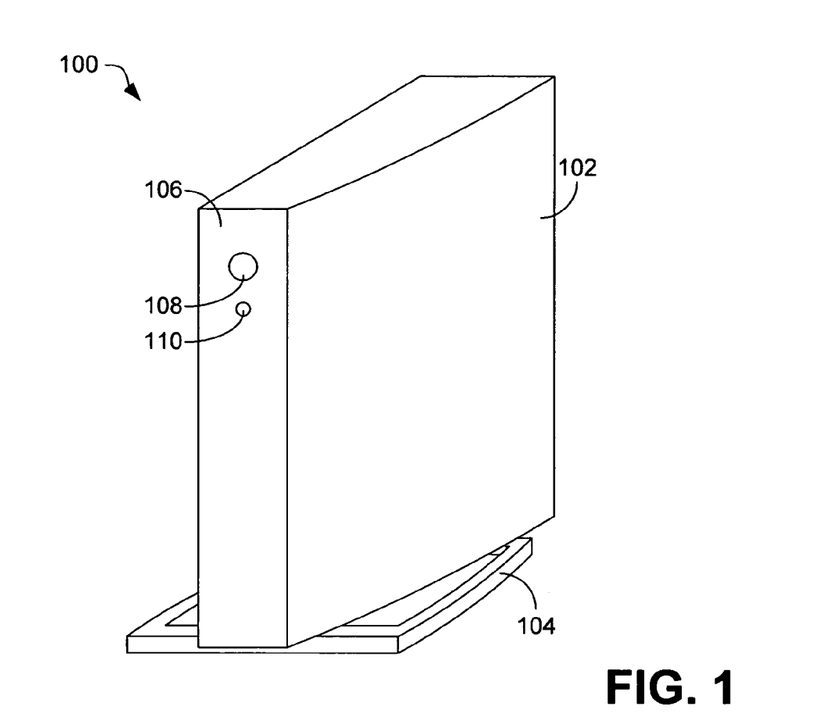
FIG. 1 is a front perspective view of an embodiment of a computing device for which a desired device state is to be restored.

Referring now to the drawings, in which like numerals indicate corresponding parts throughout the several views, FIG. 1 illustrates a computing device 100. By way of example, the computing device 100 comprises a terminal computer of the type that includes no mass storage drives such as a hard drive or a compact disc (CD) drive, but may include other nonvolatile memory, such as one or more flash-based devices. In such a case, the computing device 100 may be used as a mechanism or means for accessing other computing devices, such as local or remote servers. Although a terminal computer has been specifically identified as a possible embodiment, the computing device 100 can comprise any other computing device that includes a reset feature with which a registry is deleted and rebuilt. Examples include handheld computing devices, such as personal digital assistants, mobile telephones, and the like.

As is shown in FIG. 1, the computing device 100 includes a housing 102 that encloses an inner chassis (not visible in FIG. 1) of the computing device. In the example embodiment, the computing device 100 is mounted on a support member 104 that provides stability to the computing device so that it can be placed in an upright position illustrated in FIG. 1. On a front panel 106 of the computing device 100 is a power button 108 and a power indicator 110, such as a light-emitting diode (LED).

Figure 2:
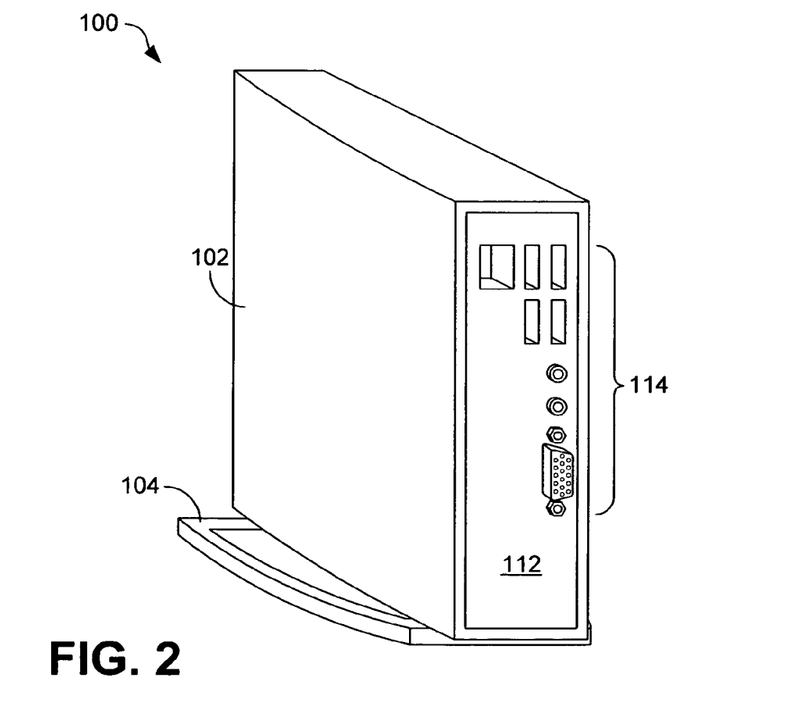
FIG. 2 is a rear perspective view of the computing device of FIG. 1.

Turning to FIG. 2, which shows the rear of the computing device 100, the computing device further comprises a rear connector panel 112 that comprises a plurality of connectors 114. The connectors 114 are coupled to a motherboard (not visible in FIG. 2) that is, for example mounted to the computing device inner chassis. By way of example, the various connectors 114 include a voice or data telephone jack, universal serial bus (USB) jacks, a microphone jack, a headphone jack, and a parallel port jack. Although those particular connectors have been cited as examples, the connectors may include other connectors.

Figure 3:
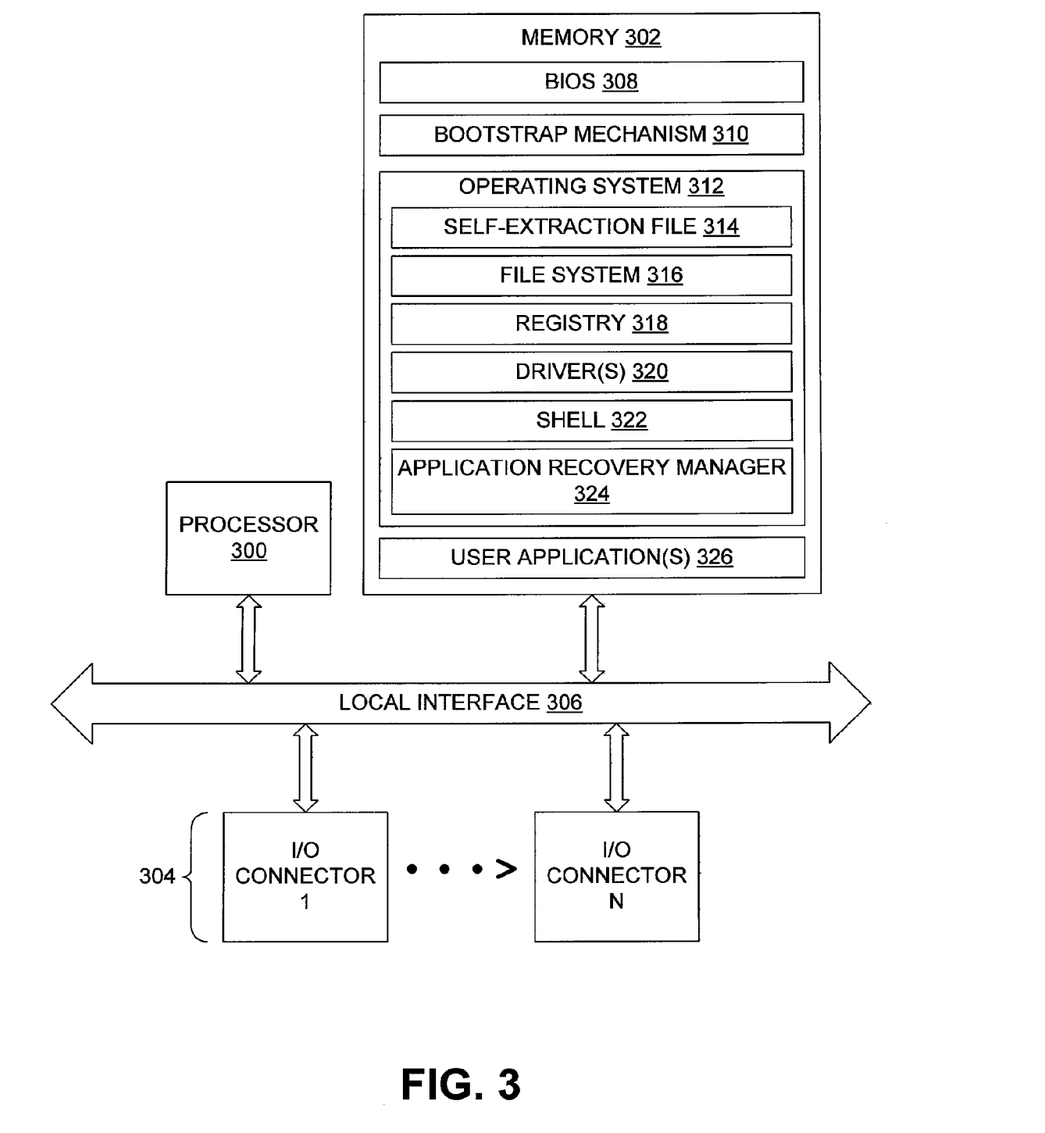
FIG. 3 is a block diagram of an embodiment of architecture for the computing device of FIGS. 1 and 2.

FIG. 3 illustrates an example architecture for the computing device 100 of FIGS. 1 and 2. As is indicated in FIG. 3, the computing device 100 comprises a processor 300 and memory 302, each of which is connected to a local interface 306. Also connected to the local interface 306 are input/output (I/O) connectors 304 (such as connectors 114, FIG. 1).

The computing device processor 300 can include a central processing unit (CPU) or an auxiliary processor among several processors associated with the computing device 100. The memory 302 includes, for example, a combination of one or more volatile memory elements (e.g., RAM) and one or more nonvolatile memory elements (e.g., flash device).

Stored in memory 302 is a basic input-output system (BIOS) 308 that comprises the code that controls low-level operation of the computing device 100 and communications with I/O devices that are connected to the computing device 100 (e.g., keyboard mouse). The memory 302 further includes a bootstrap mechanism 310 that is called by the BIOS 308 to control the computing device boot process.

Also contained in memory 302 is an operating system 312 that provides scheduling, input-output control, file and data management, memory management, and communication control, and that controls general operation of the computing device 100 from the perspective of the user. As is shown in FIG. 3, the operating system 312 comprises various components (modules and/or files) that the system uses during operation. Those components include a self-extraction file 314 that comprises an image of the operating system and that is used during the initial boot to initialize the operating system and define the environment in which it executes. By way of example, the self-extraction file 314 comprises a NK.bin file of the Windows CE™ operating system.

During the initial boot processes, the bootstrap mechanism 310 reads the self-extraction file 314, copies it to RAM, and execution then jumps to an offset of the image defined by the self-extraction file. When execution transitions to the image within RAM, the operating system 312 self-extracts to define a factory default state by creating a file system 316 and a registry 318, installing various drivers 320, loading a system shell 322, and installing any applications that comprise part of the default state. By way of example, the registry 318 comprises a persistent registry, such as a hive-based registry, which comprises a collection of files that are stored within nonvolatile memory, such as a flash device.

Also included in the operating system 302 is an application recovery manager 324. As is described in greater detail below, the application recovery manager 324 stores certain information (e.g., files) that pertain to each application 326 that has been installed after the initial boot described in the foregoing. In so doing, the application recovery manager 324 can restore an initial state of the application, including registry entries and links to the application, upon activation of a factory reset that clears the operating system registry. It is noted that, although the term "factory reset" is used herein, the term is not precisely accurate given that the factory default state would not include the applications that the user installed or any references to those applications. However, the term is used herein for convenience to distinguish over a simple reset process in which a device is simply restarted.

Various programs (i.e., logic) have been described above. It is to be understood that those programs can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. The programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As is described in the foregoing, the existence of a factory reset feature is useful in situations in which the user wishes to return to a previous device state, including a state in which a user application is in a default state that existed when the application was first installed. Unfortunately, however, the entire registry that is built during the initial boot may be erased during such a factory reset, thereby deleting every reference to and configuration settings for each application that the user installed on the device. In such a case, the applications, although still resident in memory, may be orphaned and inaccessible to the user.

Consider the following example. A user obtains the computing device and activates the device such that the initial boot described above is performed. Some time thereafter the user installs an application called "MyApp" on the device. Through the installation process, an installation program creates a shortcut icon (S1) for the computing device desktop and writes various registry information (R1) into the operating system registry. The user then uses MyApp and, at some later point, creates a new shortcut (S2) and deletes the original shortcut (S1).

Next assume that the user enters a command for the computing device to perform a factory reset. Through that factory reset, the registry, including the registry information (R1) is deleted, and a new registry is created. Because of the deletion of R1, MyApp, although still in existence, is now orphaned and, therefore, unusable. Furthermore, because the user had deleted the original shortcut (S1), and further because the operating system has no knowledge of that icon, S1 is not restored, even though the user may wish or expect it to be restored. As is described in the following, the computing device could be returned to a state in which MyApp is restored to its original state if a mechanism is available that specifically backs up and restores the registry information and original shortcut.

Examples of device state restoration will now be discussed in relation to the following flow diagrams. Process steps or blocks in these flow diagrams may represent modules, segments, or portions of code that include one or more executable instructions for implementing specific logical functions or steps in the process. Although particular example process steps are described, alternative implementations are feasible. For instance, some steps may be executed out of order from that shown and discussed depending on the functionality involved.

Figure 4:
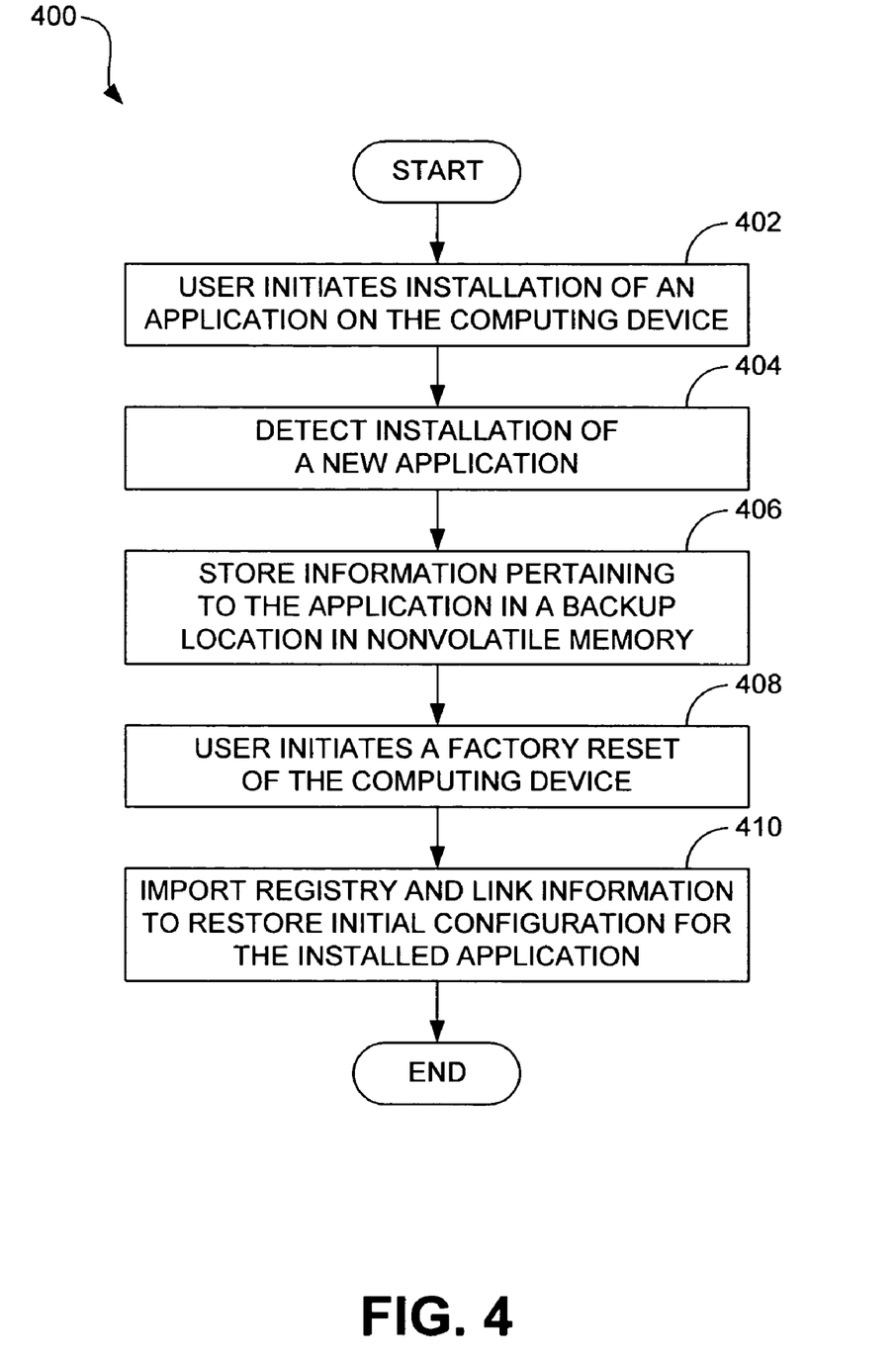
FIG. 4 is a flow diagram that illustrates an embodiment of a method for storing restoring a device state.

FIG. 4 is a flow diagram 400 that illustrates a method for restoring a device state that accounts for user-installed applications. Beginning with block 402, the user initiates installation of an application on the computing device. The particular nature of the application is unimportant and, therefore, the application can comprise substantially any user application that is not installed during the initial boot (i.e., that does not comprise part of the default image of the computing device). By way of example, the installation may be carried out by an installation program associated with the application or the operating system.

Referring next to block 404, installation of a new application is detected. This detection triggers storage of certain information pertaining to the application in a backup location within nonvolatile memory (e.g., flash device) of the computing device, as indicated in block 406. By way of example, that information comprises information about the application contained in the operating system registry, and any information that relates to the links that are used to select and/or activate the application (e.g., from the desktop and/or start menu).

At some point in the future, for instance several days or weeks later, the user may initiate a factory reset of the computing device, as indicated in block 408. By way of example, such a reset can be initiated by selecting a button provided within the graphical user interface (GUI) of the computing device, or by pressing a predetermined keyboard key (e.g., "F9" key) during pre-boot of the computing device (i.e., before the operating system boots). In response to the reset process being performed, the information pertaining to the application is imported back into the operating system to restore the initial state of the application, as indicated in block 410. By way of example, that importation comprises adding the backup registry information to the reconstructed registry and adding the information that relates to the application links to the device file system so that those links can be recreated.

Figure 5:
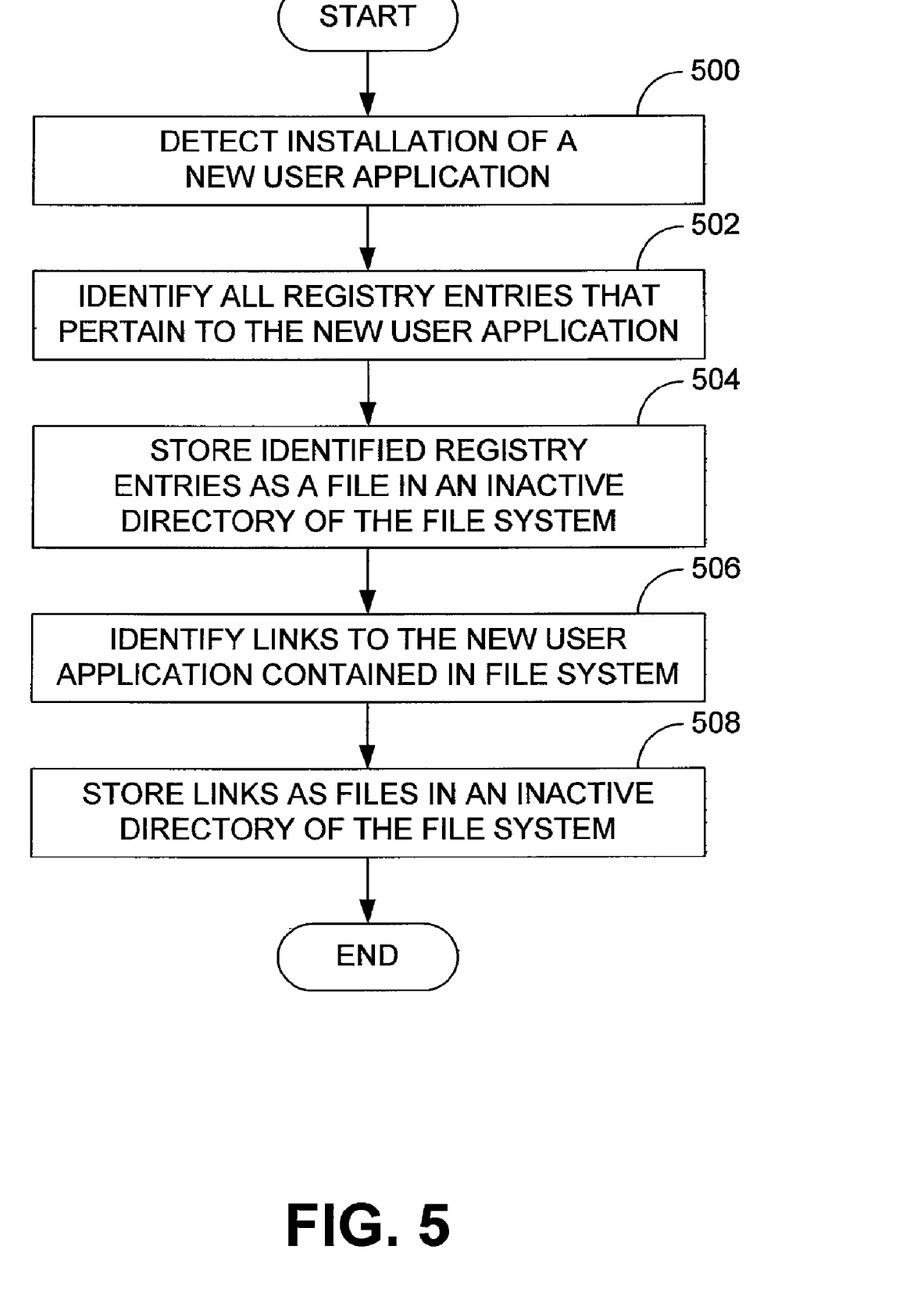
FIG. 5 is a flow diagram that illustrates an embodiment of operation of the application recovery manager shown in FIG. 3 in storing backup information pertaining to an installed application.

FIG. 5 is a flow diagram that illustrates an embodiment of operation of the application recovery manager 324 (FIG. 3) in storing backup information pertaining to an installed application. Beginning with block 500, the recovery manager 324 detects installation of a new user application. By way of example, the recovery manager 324 detects that installation by scanning one or more predetermined file system directory paths for the existence of a program install file (e.g., a .CAB file), for instance, during the boot process. As is described above, the installation can be completed by an installation program that is associated with the application that is being installed or that comprises part of the operating system. Through installation, an executable file and one or more link files may be stored in the persistent file system. For example, the following files may be created for an application call "MyApp":

\Hard Disk\Program Files\MyApp.exe

\Hard Disk\Desktop\MyApp.LNK

\Hard Disk\Programs\MyApp.LNK where the .LNK extension identifies link information, such as application shortcuts. In addition, the installation program adds various new registry entries that identify the new user application to the operating system and that set the configuration for the application.

Once the registry entries have been added by the installation program, the recovery manager 324 identifies all registry entries that pertain to the new user application, as indicated in block 502. By way of example, those entries are identified by scanning one or more predetermined file system directory paths (i.e., paths that pertain to the user application) for the existence of registry files (e.g., .REG files). After that identification has been made, the recovery manager 324 stores the identified registry entries as a file in an inactive directory of the computing device file system, as indicated in block 504. By way of example, that file, i.e., a backup registry file, can be stored in a dedicated backup directory within the persistent file system. For example, the following file can be created:

\Hard Disk\Backup\MyApp.REG

Next, the recovery manager 324 identifies the links to the user application that are contained in the file system, as indicated in block 506. Again, those links can be identified by scanning one or more predetermined file system directory paths that may contain links (e.g., .LNK files) for the application. In keeping with the above example, those links are represented by link (.LNK) files within the file system. Once those links are identified, the recovery manager 324 stores the links as files in an inactive directory of the file system, as indicated in block 508. In some cases, the files, i.e., backup link files, are stored within the same directory in which the backup registry file was stored. For example, the following files can be created:

\Hard Disk\Backup\Desktop\MyApp.LNK

\Hard Disk\Backup\Programs\MyApp.LNK

At this point, backup files have been created by the application recovery manager 324 that can be used to re-establish the initial state of the user application in a situation in which a factory reset is performed and the operating system registry is deleted.

Figure 6:
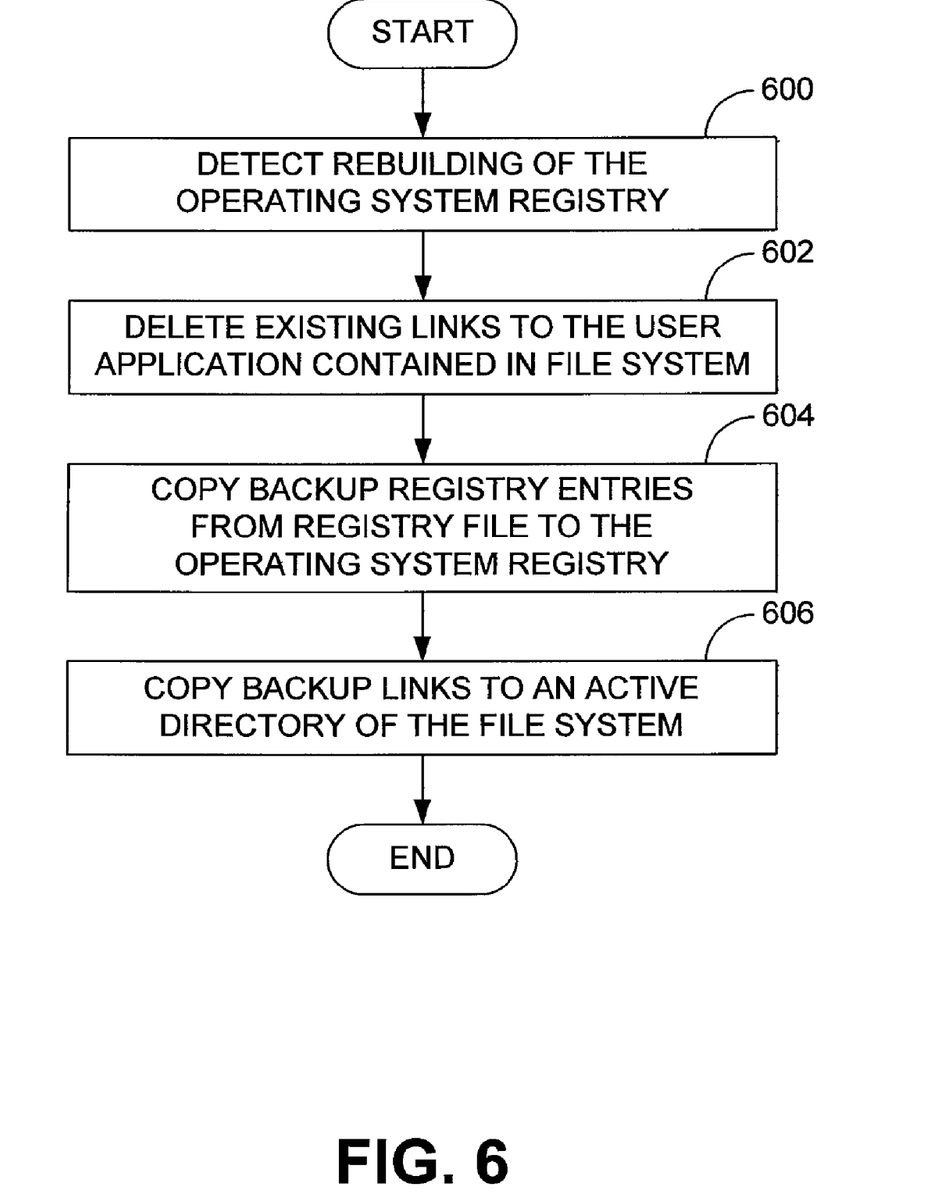
FIG. 6 is a flow diagram that illustrates an embodiment of operation of the application recovery manager shown in FIG. 3 in recovering information pertaining to an installed application.

FIG. 6 is a flow diagram that illustrates an embodiment of operation of the application recovery manager 324 in recovering information pertaining to an installed application, for example the user application described in relation to FIG. 5. Beginning with block 600, the recovery manager 324 detects rebuilding of the operating system registry, which indicates that a factory reset has been initiated. By way of example, this detection is made in response to a call made by the operating system to the recovery manager 324 after the registry has been rebuilt. Alternatively, the recovery manager 324 can be specifically configured to affirmatively interrogate the system registry to determine when the registry has been rebuilt.

After that detection has been made, the recovery manager 324 deletes any existing links to the user application contained in any active directories of the file system, as indicated in block 602. By doing this, the recovery manager 324 automatically removes any links that the user may have created so as to enable recovery of the initial state or default of the application.

Next, with reference to block 604, the recovery manager 324 copies the backup registry entries from the backup registry file (e.g., "\Hard Disk\Backup\MyApp.REG") to the operating system registry so as to restore the original registry entries as they existed immediately after installation of the application. Finally, referring to block 606, the recovery manager 324 copies the backup links to the appropriate active directory or directories of the file system from which they originated (e.g., "\Hard Disk\Desktop\MyApp.LNK" and "\Hard Disk\Programs\MyApp.LNK").

Through the above-described process, the recovery manager 324 restores the application to its initial or default state as it existed immediately after installation. Accordingly, when a factory reset is performed, the computing device is reset to a state in which the application is recognized by the operating system and the user can access and use the application.

Figure 7:
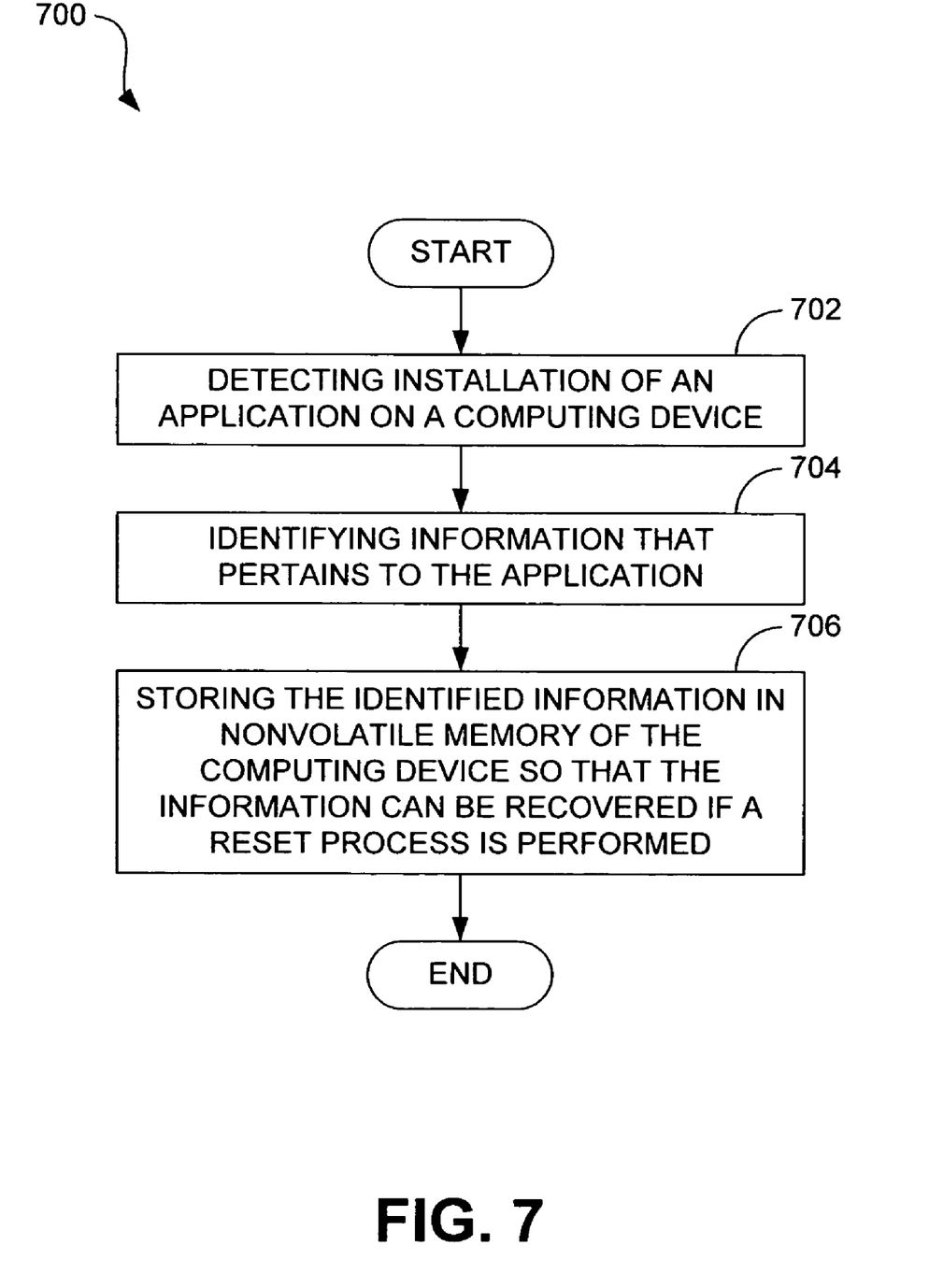
FIG. 7 is a flow diagram that illustrates a further embodiment of a method for restoring a device state.

In view of the above, a method 700 for recovering a device state can be described as is indicated in FIG. 7. That method comprises detecting installation of an application on a computing device (702), identifying information that pertains to the application (704), and storing the identified information in nonvolatile memory of the computing device so that the information can be recovered if a reset process is performed (706).

What is claimed is:

1. A method for recovering a device state of a computer, the method comprising:
    detecting installation of a user application on the computer, the user application comprising a program that was not installed during an initial boot of the computer;
    upon detection of installation of the user application, identifying information including at least one of registry information and link information that pertains to the application and storing the identified information in nonvolatile memory of the computer so that the information can be recovered if a reset process is performed on the computer; and detecting rebuilding of an operating system registry and, upon detecting the rebuilding, importing the stored information to restore a previous state of the computer.

2. The method of claim 1, wherein detecting installation comprises scanning a predetermined file system directory for a program install file.

3. The method of claim 1, wherein identifying information comprises identifying registry entries within an operating system registry of the computer, the registry entries identifying the application and defining a configuration of the application.

4. The method of claim 1, wherein identifying information comprises identifying a link file that defines a link that is used to access the application.

5. The method of claim 4, wherein the link file defines a shortcut that is provided in one of an operating system desktop or start menu of the computer.

6. The method of claim 1, wherein storing the identified information comprises storing the identified information in an inactive directory of a file system of the computer.

7. The method of claim 1, wherein storing the identified information comprises storing registry entries that pertain to the application in a backup registry file.

8. The method of claim 1, wherein storing the identified information comprises storing a link file in a backup directory.

9. The method of claim 1, wherein detecting rebuilding occurs in response to a call received by the operating system.

10. The method of claim 1, wherein importing the stored information comprises writing registry entries into the rebuilt operating system registry.

11. The method of claim 1, wherein importing the stored information comprises storing a link file in an active directory of a file system of the computer.

12. A computer-readable medium that stores a system for recovering a state of a computer, the system comprising:

means for detecting installation of a new user application that comprises a program that was not installed during an initial boot of the computer;

means for upon detection of installation of the new user application identifying particular information including at least one of registry information and link information pertaining to the new user application that is stored on the computer during installation;

means for storing a back-up copy of the particular information in an inactive directory of a file system of the computer so that the information is available for a recovery process; and means for detecting rebuilding of an operating system registry.

13. The computer-readable medium of claim 12, wherein the means for detecting comprise means for scanning a predetermined file system directory for a program install file.

14. The computer-readable medium of claim 12, wherein the means for identifying comprise means for identifying registry entries stored in an operating system registry of the computer.

15. The computer-readable medium of claim 12, wherein the means for identifying comprises identifying link files that define links to the application.

16. The computer-readable medium of claim 12, wherein the means for storing comprise means for storing the identified information in an inactive directory of a file system of the computer.

17. The computer-readable medium of claim 12, further comprising means for writing registry entries into the rebuilt operating system registry and means for storing a link file in an active directory of a file system of the computer.

18. A computer-readable medium that stores an application recovery manager, the manager comprising:

logic configured to detect when a user application is installed on a computer on which the manager resides, the user application comprising a program that was not installed during an initial boot of the computer;

logic configured to, in response to detecting application installation, copy registry entries within an operating system registry that correspond to the application to the computer file system;

logic configured to detect when the operating system registry has been rebuilt; and logic configured to, in response to detecting registry rebuilding, write the copied registry entries to the rebuilt operating system.

19. The computer-readable medium of claim 18, wherein the logic configured to detect when a user application is installed is configured to scan a predetermined file system directory for a program install file.

20. The computer-readable medium of claim 18, wherein the logic configured to detect when the operating system registry has been rebuilt is configured to interrogate the registry to determine when the registry has been rebuilt.

21. The computer-readable medium of claim 18, further comprising logic configured to, in response to detecting application installation, copy link files within the computer file system to a backup directory of the file system.

22. The computer-readable medium of claim 21, further comprising logic configured to write the copied link files into an active directory of the computer file system in response registry rebuilding.

23. A terminal computer, comprising:

a processor; and memory including an operating system that defines a file system and a registry, the memory further including an application recovery manager that is configured to, in response to detected installation of a new user application that was installed by a user after the computer was initially booted, copy registry entries that correspond to the new user application to the file system, and to, in response to detection of the registry being rebuilt, write the copied registry entries into the rebuilt operating system.

24. The terminal computer of claim 23, wherein the application recovery manager is configured to, in response to detected installation of the new user application on the computer, copy link files within an active directory of the file system to a backup directory of the file system.

25. The terminal computer of claim 24, wherein the application recovery manager is further configured to, in response to the registry being rebuilt, write the copied link files back into an active directory of the file system.

* * * * *